April 5, 1966 E. KÖNIG ET AL 3,243,991

HEAT CONDUCTIVITY DETECTOR CELL FOR GAS ANALYSIS DEVICES

Filed Feb. 4, 1963

United States Patent Office
3,243,991
Patented Apr. 5, 1966

3,243,991

HEAT CONDUCTIVITY DETECTOR CELL FOR GAS ANALYSIS DEVICES

Eberhard König, Uberlingen (Bodensee), and Hans Egon Rödel, Sipplingen (Bodensee), Germany, assignors to Bodenseewerk Perkin-Elmer & Co. G.m.b.H., Uberlingen (Bodensee), Germany Filed Feb. 4, 1963, Ser. No. 255,879
Claims priority, application Germany, Feb. 13, 1962, B 65,919
5 Claims. (Cl. 73—27)

This invention relates to a heat conductivity detector cell for gas analysis devices. It is known that such cells serve for determining from the heat conductivity of a gas passed thereacross the composition of such gas. For this purpose an electric heating element, for instance a filament or a thermistor bead, is arranged in the cell, the electric resistance of which changes with the temperature. When a gas with high heat conductivity flows through the cell, the heating element loses heat more rapidly than when a gas, having a lower heat conductivity, flows through the cell, the latter (less conductive) gas providing a better heat insulation for the heating element. As a rule, two such heat conductivity detector cells are provided, through one of which the gas to be analyzed flows, and through the other flows a comparison gas. In the electrical bridge diagonal a voltage is developed if the heat conductivity of the measuring gas differs from that of the comparison gas due to an additional component contained in the analyzed gas, so that the heating element of the analyzing detector cell consequently assumes a different temperature and therefore electric conductivity than that of the comparison cell.

Such arrangements have been partly used in order to directly measure the concentration of a specific component in a measuring gas, such as of $CO_2$ in air. They are, however, also utilized as detectors in gas chromatographic devices in order to indicate the components successively appearing at the outlet of the separating column of an analyzed mixture in the carrier gas flow and to record them.

In conventional separation of mixtures by means of gas chromatography a carrier gas, such as helium, is fed through a separating column and a sample to be analyzed is injected into the carrier gas flow at the entrance of the column. The separating column contains a separating substance to which the individual components of the sample are strongly but differently attracted. This causes the different components to be carried through the separating column by the carrier gas at different speeds; and successively appear at the outlet thereof. A heat conductivity detector cell is arranged at the outlet, which responds to the differences of the heat conductivity of the mixture components relative to that of the pure carrier gas. As a rule, a second cell is provided through which flows pure carrier gas. The heating elements of both cells are in turn connected in an electrical bridge circuit.

In existing gas chromatographic devices the measuring chambers of the heat conductivity detector cells are usually arranged in a metallic detector block. Thereby relatively large dead zones occur which increase the response time of the detector and particularly result in difficulties if very small substance quantities are being analyzed. This applies in particular when using capillary or Golay columns in gas chromatography. In such columns, the separating substance is present on the walls of a capillary tube so that a central passageway remains for the passage of the carrier and sample substance flow. Such columns permit analysis of very small sample substance quantities so that for these columns heat conductivity detector cells of the customary type are not suitable; and instead flame ionization detectors or $\beta$-rays-ionization detectors are utilized. However, these types of detectors are relatively complicated and additionally suffer from the shortcoming that gases with high ionizing energy are hard to detect therewith.

Heat conductivity detector cells composed of glass are disclosed, for example, in German Patent No. 1,061,098. In this patented arrangement the inlet and the outlet tubes are connected by two more or less parallel branch tubes; a generally U-shaped chamber is connected between the middle of these two branch tubes, and a detector filament is sealed in one arm of this U-shaped chamber. It is further known that such detector cells of glass may be designed as a very little unit. However, in this known arrangement the cells have such a form that a certain minimum volume must be maintained. In the case of low velocities of flow (i.e., small substance quantities) this will result in an undesirably long response time. Thus, these known heat conductivity detector cells are therefore not suitable for many purposes, particularly for capillary tube chromatography.

It is the object of this invention to provide heat conductivity detector cells of extremely small volume which guarantee an adequate response time even with low velocities of flow.

According to this invention this object is attained by providing a sleeve-like glass casing or container, into which capillary tubes for inlet and outlet are sealed or cemented on both sides, the heating element is positioned in the detector cell chamber formed between the confronting faces or ends of the tubes. Such cells may be so designed that they have an extremely small volume of, for instance, 0.001 ml. To this end, the glass container might for instance have an internal diameter of 0.85 mm. The capillary tubes may have an external diameter of 0.8 mm. and an internal diameter of 0.2 mm. The distance of the capillary tube ends may be 2 mm. A thermistor may be arranged in the cell as heating element and detector, which response time substantially determines the response time of the cell. When using thermistors of short response time such cells may open new fields of application for gas chromatography. When using such cells, by way of example, minute gas quantities may be analyzed as they occur in the form of enclosed small gas bubbles in glass, plastic, metals or biological material. Detector cells according to the invention may be advantageously used for many other purposes. The invention makes possible the production of heat conductivity detector cells of very small volume in a simple manner.

In order to avoid dead volume it is advantageous in capillary tube chromatography to use a Golay column as the detector supply line. Thus, the chamber of the heat conductivity detector cell is directly connected to the separating column.

In further modifications of the invention the capillary tubes are metallic and simultaneously serve as current supply for the heating element. Then it is not necessary to provide separate leads for the current supply, which might be difficult in the case of very small cells.

Frequently, it is undesirable in heat conductivity detector cells if the heating (and detecting) element is positioned directly in the gas flow. Then, the cooling of the heating element is not only dependent on the heat conductivity of the gas, but said cooling is also dependent on the velocity with which the gas passes by the heating element. Therefore, heat conductivity detector cells of the so-called diffusion type have been provided wherein the heating element is not positioned directly in the gas flow, but out of the gas flow in a lateral chamber which in turn is in communication with the main passageway. Then, the gas enters into this lateral chamber only by diffusion or chimney-effect. This, however, suffers from the shortcoming that these cells are relatively inert (i.e., slow reacting). For avoiding these disadvantages it is known to shield the cells arranged in the main passageway of the gas with a grid. It has been proven that then a substantial freedom from the effect of the velocity of flow is obtained without increasing the undesirable inertia (i.e., speed of response) of the cells.

This use of a gridlike baffle is also applicable to cells according to the invention. In some modifications of the invention a baffle grid (which are not novel in themselves) is therefore arranged on each side of the heating element, by being secured to the front face of the adjacent capillary tube. By use of such baffle grids the desired independence of the velocity of flow is also obtained in the heat conductivity detector cells according to the invention wherein the heating element must generally be directly positioned in the gas flow. Preferably the heating element is connected between the grids and is in conductive connection therewith.

A few embodiments of the invention are presented in the drawings as follows.

Figure 1:
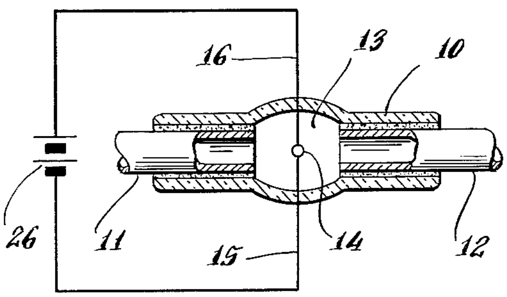
FIG. 1 shows a heat conductivity detector cell of the invention in section.

Capillary tubes 11, 12 are inserted (and connected, for instance by being sealed, pasted or cemented) into a sleevelike glass body 10 on both sides. Between the front faces of the capillary tubes 11 and 12 a measuring chamber 13 of very small volume is provided in which a thermistor bead 14 is arranged serving as heating element and detector. In the embodiment according to FIG. 1 the electric current leads 15, 16 for the bead 14 are carried out perpendicularly to the axis of the capillary tubes 11, 12 and advantageously sealed therein. Leads 15 and 16 are connected to opposite sides of a current source 26.

Figure 2:
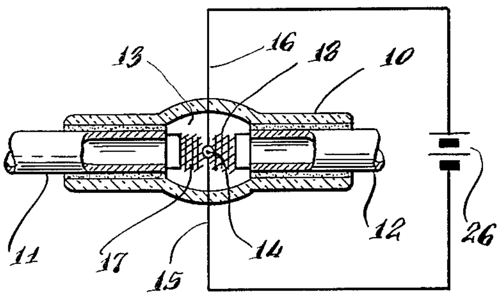
FIG. 2 shows a modified embodiment.

In the embodiment according to FIG. 2, which in its basic design corresponds to FIG. 1, shielding grids 17, 18 are arranged on both sides of the thermistor bead 14, which grids are secured to the front faces of the adjacent capillary tubes 11 and 12, respectively.

Figure 3:
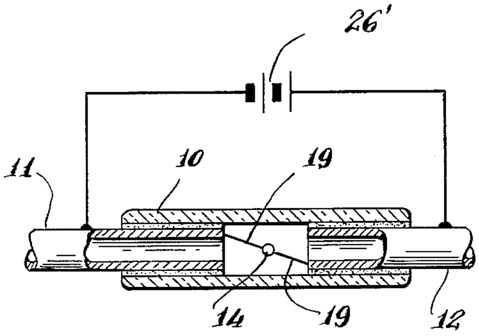
FIG. 3 shows a third embodiment of the invention in section, wherein the capillary tubes simultaneously serve as current supply lead.

In the embodiment according to FIG. 3 the metallic capillary tubes themselves serve as current supply leads for the thermistor bead 14, which is fixed between the front faces of the capillary tubes by means of wires 19. Current therefore flows from one side of source 26' through one metal capillary (say, 11) through wires 19 and the thermistor 14, to the other metal capillary, and then back to the other side of the source 26'.

Figure 4:
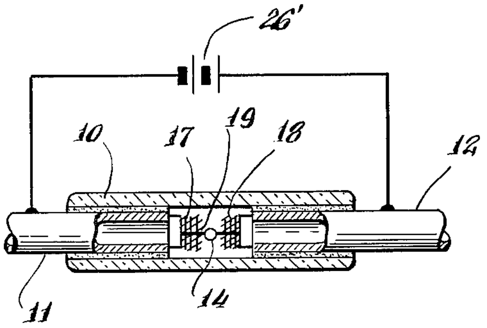
FIG. 4 shows a further embodiment of the invention, also in section.

FIG. 4 illustrates a further embodiment with (electrically conductive) shielding grids 17, 18 and current supply leads through the capillary tubes 11, 12. Herein, the grids 17, 18 are secured to the metallic capillary tubes 11, 12. The thermistor bead 14 is fixed between the grids by means of the wires 19 and in conductive connection therewith. The FIG. 4 embodiment thus combines both the utilization of grids (as in FIG. 2) and the use of the metallic capillary tubes as current supply leads (as in FIG. 3).

Figure 5:
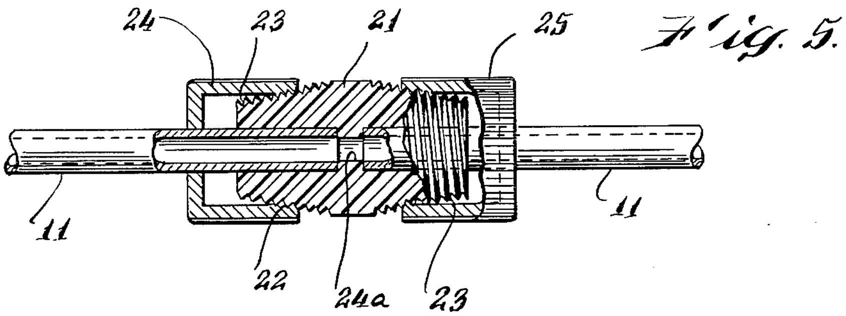
FIG. 5 shows an insulating intermediate piece used with the invention.

The current lead through the capillary tubes requires at least one of the capillary tubes to be insulated. For this purpose an insulating intermediate piece is provided as illustrated in FIG. 5 and which isolates the part of that one of the capillary tubes (e.g., 11) which serves as current lead, from the rest of the capillary tube. The insulating intermediate piece has a sleeve-shaped part 21 of insulating material such as polytetrafluorethylene, which has external taper threads 22, 23 on both ends. Into this part 21 the ends of the two parts of the capillary tube (e.g., 11) to be connected are inserted in such manner that their confronting faces abut an insulating internal flange 24a. On both ends flanged nut unions 24, 25 are screwed onto the threads 22, 23 whereby the sleeve ends are compressed and the capillary tubes clamped.

The inlet capillary tube (11, for instance) may be a Golay-column.

In the claims the term "minute" is used to mean being in the neighborhood of one order of magnitude of the capillary column external diameter (0.8 mm.), and therefore includes, in the specific embodiment, between about 0.08 to about 8 millimeters. With somewhat different sized capillary columns, the cell dimensions might be somewhat different than in the example previously given. Similarly, the term "close-spaced" means within about the range defined just above for "minute."

We claim:

1. A heat conductivity detector for gas analysis devices comprising:

an inlet capillary tube having an exit end, at which the gas sample components will evolve in time-spaced sequence;

a small, sleeve-shaped detector casing having one end sealingly attached to said exit end of said inlet tube;

a minute heating element, of the type which changes its electrical characteristics with temperature, positioned inside said casing;

an outlet capillary tube having its entrance end sealingly attached to the other end of said detector casing in substantially axial alignment with said inlet tube;

and means for supplying electric current to said heating element;

said sleeve-shaped detector casing being of substantially cylindrical shape having its axis aligned with the axes of said inlet and outlet capillary tubes, the internal diameter of said cylindrical casing being substantially the same as the outer diameter of said capillary tubes, and the exit end of said inlet tube and the entrance end of said outlet tube being spaced apart a distance less than about three times the external diameter of said capillary tubes, so that the chamber defined by the internal walls of said casing and said ends of said tubes is extremely small.

2. A heat conductivity detector as defined in claim 1, in which:

grid baffles are attached to said ends of said capillary tubes in such position as to be in the path of the gas flow which would otherwise directly impinge upon said heating element;

so as to shield said heating element from the full force of the gas flow and therefore from substantially all of the cooling effect caused by such direct impinging.

3. A heat conductivity detector according to claim 1, particularly adapted for use in gas chromatography, in which:

said inlet capillary tube comprises a Golay-type of separating column.

4. A heat conductivity detector for gas analysis devices comprising:

an inlet capillary tube having an exit end, at which the gas sample components will evolve in time-spaced sequence;

a small, sleeve-shaped detector casing having one end sealingly attached to said exit end of said inlet tube;

a minute heating element, of the type which changes its electrical characteristics with temperature, positioned inside said casing;

an outlet capillary tube having its entrance end sealingly attached to the other end of said detector casing;

said capillary tubes being metallic so as to be capable of carrying electric current;

means for electrically connecting said heating element to said ends of said tubes, so that said tubes may act as current-carrying leads to said heating element;

means for supplying electric current, connected to one of said tubes;

insulating means electrically isolating that part of the one of the capillary tubes to which said current supply is connected, so that said current is isolated from escape along said tube in the direction remote from said detector and is therefore led to said heating element;

said sleeve-shaped detector casing having a minute internal diameter, and the exit end of said inlet tube and the entrance end of said outlet tube being in close-spaced relation;

so that the chamber defined by the internal walls of said casing and said ends of said tubes is extremely small.

5. A heat conductivity detector for gas analysis devices comprising:

an inlet metallic capillary tube having an exit end, at which the gas sample components will evolve in time-spaced sequence;

a small, sleeve-shaped detector casing having one end sealingly attached to said exit end of said inlet tube;

an outlet metal capillary tube having its entrance end sealingly attached to the other end of said detector casing, so as to be in spaced confronting relationship with said exit end of said inlet tube;

a pair of grid baffles of electrically conductive material, each attached to one of said confronting ends of said metallic capillary tubes, so as to be in the path of gas flow;

a minute heating element, of the type which changes its electrical characteristics with temperature, within said detector casing and attached across said grid baffles, thereby being shielded from the full force of the gas flow and therefore from substantially all of the cooling effect which would be caused by direct impinging of said full gas flow force;

said heating element therefore being electrically connected to both of said grid baffles, and each of said baffles being electrically connected to one of said confronting ends of said metallic capillary tubes;

means for supplying electric current, connected to one of said tubes;

so that electric current may flow from said current supplying means to and through said one metallic capillary tube, through one of said grid baffles, to one side of said heating element, through said element to the other grid baffle, and then to the other metallic capillary tube;

and insulating means electrically isolating that part of the one of the capillary tubes to which said current supply is connected, so that said current is isolated from escape along said tube in the direction remote from said detector and is therefore led to said heating element;

said sleeve-shaped detector casing having a minute internal diameter, and the exit end of said inlet tube and the entrance end of said outlet tube being in close-spaced relation;

so that the chamber defined by the internal walls of said casing and said ends of said tubes is extremely small.

References Cited by the Examiner

UNITED STATES PATENTS

| | | | |
|---|---|---|---|
| 2,269,850 | 1/1942 | Hebler | 73—27 |
| 2,326,884 | 8/1943 | Phelps | 73—27 |
| 2,557,008 | 6/1951 | Poole | 73—27 |
| 3,075,379 | 1/1963 | Schmauch | 73—27 |
| 3,106,088 | 10/1963 | Kieselbach | 73—27 |
| 3,134,257 | 5/1964 | Reinecke | 73—27 |
| 3,184,953 | 5/1965 | Petrocelli | 73—23.1 |

OTHER REFERENCES

"Nature" published April 23, 1960 (pages 309, 310 relied on).

RICHARD C. QUEISSER, *Primary Examiner.*

DAVID B. DEIOMA, J. FISHER, *Assistant Examiners.*